(12) United States Patent
Parrella et al.

(10) Patent No.: US 11,754,205 B2
(45) Date of Patent: Sep. 12, 2023

(54) METHOD AND APPARATUS OF MAKING PIPES AND PANELS USING A TREATED FIBER THREAD TO WEAVE, BRAID OR SPIN PRODUCTS

(71) Applicant: Exotex, Inc., Westport, CT (US)

(72) Inventors: Michael J. Parrella, Weston, CT (US); Bart A. Siegel, Greenback, TN (US); Nevil R. Ede, Westport, CT (US)

(73) Assignee: EXOTEX, INC., Houston, TX (US)

( * ) Notice: Subject to any disclaimer, the term of this patent is extended or adjusted under 35 U.S.C. 154(b) by 622 days.

(21) Appl. No.: 15/552,871

(22) PCT Filed: Feb. 23, 2016

(86) PCT No.: PCT/US2016/019077
§ 371 (c)(1),
(2) Date: Aug. 23, 2017

(87) PCT Pub. No.: WO2016/137958
PCT Pub. Date: Sep. 1, 2016

(65) Prior Publication Data
US 2018/0044849 A1    Feb. 15, 2018

Related U.S. Application Data

(60) Provisional application No. 62/119,497, filed on Feb. 23, 2015.

(51) Int. Cl.
*D06M 15/55* (2006.01)
*C03C 25/10* (2018.01)
(Continued)

(52) U.S. Cl.
CPC ........ *F16L 11/085* (2013.01); *C03C 25/1095* (2013.01); *C03C 25/36* (2013.01);
(Continued)

(58) Field of Classification Search
CPC .. B32B 1/02; B32B 1/08; B32B 5/024; C03C 25/1095; C03C 25/36; D03D 15/00;
(Continued)

(56) References Cited

U.S. PATENT DOCUMENTS

| 2,021,378 A | 11/1935 | Prosser |
| 2,170,207 A | 8/1939 | Mosier et al. |

(Continued)

FOREIGN PATENT DOCUMENTS

| CN | 101642681 | 2/2010 |
| CN | 201482323 | 5/2010 |

(Continued)

OTHER PUBLICATIONS

"Aviation Maintenance Technician Handbook—Airframe", U.S. Department of Transportation & Federal Aviation Administration, vol. 1, 2012, 79 pages.

(Continued)

*Primary Examiner* — Jeremy R Pierce
(74) *Attorney, Agent, or Firm* — Ware, Fressola, Maguire & Barber LLP (57) ABSTRACT

Materials and pipes made from woven, knit, spun or braided fiber threads that provide high tensile strength and caustic resistance. A fibrous material, made from a substance such as fiberglass or basalt, is bound to an epoxy resin, which is cured to create a durable material that can be used in several applications, including applications involving high heat and caustic materials.

19 Claims, 7 Drawing Sheets

(51) Int. Cl.
| | |
|---|---|
| *D03D 1/00* | (2006.01) |
| *D03D 15/00* | (2021.01) |
| *D01D 5/00* | (2006.01) |
| *F16L 11/08* | (2006.01) |
| *C03C 25/36* | (2006.01) |
| *C03C 25/1095* | (2018.01) |
| *C08J 5/04* | (2006.01) |

(52) U.S. Cl.
CPC .............. *C08J 5/043* (2013.01); *C08J 5/0405* (2021.05); *D01D 5/00* (2013.01); *D03D 1/00* (2013.01); *D03D 15/00* (2013.01); *D06M 15/55* (2013.01); *F16L 11/081* (2013.01); *C08J 2363/00* (2013.01); *D10B 2101/00* (2013.01); *D10B 2505/02* (2013.01)

(58) Field of Classification Search
CPC .... D03D 15/20; D03D 15/242; D03D 15/247; D03D 15/267; D06M 15/55; F16L 11/08; F16L 11/085; F16L 11/086; F16L 11/087; F16L 11/088; F16L 11/125; F16L 11/127
See application file for complete search history.

(56) References Cited

U.S. PATENT DOCUMENTS

| | | | |
|---|---|---|---|
| 2,981,332 A | 4/1961 | Miller et al. | |
| 3,053,715 A | 9/1962 | Labino | |
| 3,219,472 A | 11/1965 | Hucks, Jr. | |
| 3,240,643 A | 3/1966 | Schroeder et al. | |
| 3,314,450 A | 4/1967 | Doering et al. | |
| 3,489,626 A | 1/1970 | Rubenstein | |
| 3,581,778 A | 6/1971 | Korejwa et al. | |
| 3,650,864 A | 3/1972 | Goldsworthy | |
| 3,728,187 A | 4/1973 | Martin | |
| 3,742,985 A | 7/1973 | Rubenstein | |
| 3,808,087 A | 4/1974 | Milewski et al. | |
| 3,879,243 A | 4/1975 | Medney | |
| 3,917,530 A | 11/1975 | Boske | |
| 4,026,747 A | 5/1977 | DeLorean et al. | |
| 4,217,158 A | 8/1980 | Puck | |
| 4,235,561 A | 11/1980 | Peterson | |
| 4,415,613 A | 11/1983 | Medney | |
| 4,654,407 A | 3/1987 | Domeier | |
| 4,691,450 A | 9/1987 | Glaser et al. | |
| 4,695,344 A | 9/1987 | Crane et al. | |
| 4,943,472 A | 7/1990 | Dyksterhouse et al. | |
| 5,260,121 A | 11/1993 | Gardner et al. | |
| 5,549,947 A * | 8/1996 | Quigley ................ | B29C 70/085 156/169 |
| 5,799,705 A | 9/1998 | Friedrich et al. | |
| 6,006,829 A | 12/1999 | Whitlock et al. | |
| 6,053,213 A | 4/2000 | Jung et al. | |
| 6,139,942 A | 10/2000 | Hartness et al. | |
| 6,302,621 B1 | 10/2001 | Miya et al. | |
| 6,352,108 B1 | 3/2002 | Meyer et al. | |
| 6,461,554 B2 | 10/2002 | Dewimille et al. | |
| 6,763,853 B1 | 7/2004 | Redding et al. | |
| 6,782,932 B1 | 8/2004 | Reynolds, Jr. et al. | |
| 8,210,212 B2 | 7/2012 | Buchner | |
| 2002/0040898 A1 | 4/2002 | Von Arx et al. | |
| 2003/0119398 A1 | 6/2003 | Bogdanovich et al. | |
| 2004/0157519 A1 | 8/2004 | Goodell et al. | |
| 2004/0169308 A1 | 9/2004 | Walker et al. | |
| 2005/0023002 A1 | 2/2005 | Zamora et al. | |
| 2006/0162906 A1 | 7/2006 | Hong et al. | |
| 2006/0207673 A1 | 9/2006 | O'Brien et al. | |
| 2007/0107791 A1 | 5/2007 | Rice et al. | |
| 2007/0108112 A1 | 5/2007 | Jones et al. | |
| 2007/0281092 A1 | 12/2007 | Fredrickson et al. | |
| 2008/0093123 A1 | 4/2008 | Pinto Bascompte | |
| 2009/0004453 A1 | 1/2009 | Murai et al. | |
| 2009/0044936 A1 | 2/2009 | Schulz | |
| 2009/0107558 A1 | 4/2009 | Quigley et al. | |
| 2009/0159146 A1 | 6/2009 | Jackson et al. | |
| 2009/0208684 A1 | 8/2009 | Dunleavy et al. | |
| 2010/0154917 A1 | 6/2010 | Batallas et al. | |
| 2010/0178842 A1 | 7/2010 | Thompson | |
| 2010/0243547 A1 | 9/2010 | Justice | |
| 2010/0263761 A1 | 10/2010 | Niccolls et al. | |
| 2010/0271253 A1 | 10/2010 | Shah et al. | |
| 2011/0272082 A1 | 11/2011 | Dunleavy et al. | |
| 2012/0155813 A1 | 6/2012 | Quigley et al. | |
| 2013/0081347 A1 | 4/2013 | Dewar et al. | |
| 2013/0209839 A1 * | 8/2013 | Hucker ............... | H01M 50/409 429/231.8 |
| 2014/0072740 A1 | 3/2014 | Zaiser et al. | |
| 2014/0113104 A1 | 4/2014 | Rozant et al. | |
| 2014/0154437 A1 | 6/2014 | Schroeder et al. | |
| 2014/0179187 A1 | 6/2014 | Restuccia et al. | |
| 2014/0265311 A1 | 9/2014 | Taylor | |
| 2015/0047769 A1 | 2/2015 | Quinn et al. | |
| 2015/0068633 A1 * | 3/2015 | Lazzara ............... | F16L 58/1063 138/99 |
| 2015/0099078 A1 | 4/2015 | Fish | |
| 2017/0167119 A1 | 6/2017 | Stone | |
| 2017/0341978 A1 | 11/2017 | Zaiser | |
| 2018/0045341 A1 | 2/2018 | Parrella | |
| 2018/0141310 A1 | 5/2018 | Coumans | |
| 2018/0200714 A1 | 7/2018 | Viovy et al. | |
| 2018/0259115 A1 | 9/2018 | Parrella et al. | |

FOREIGN PATENT DOCUMENTS

| | | |
|---|---|---|
| DE | 3516628 | 11/1986 |
| EP | 0216518 | 4/1987 |
| WO | 2010039358 | 4/2010 |
| WO | 2010096935 | 9/2010 |
| WO | 2014066386 | 5/2014 |

OTHER PUBLICATIONS

"The matrix" www.compositesworld.com/articles/the-matrix, Jan. 1, 2014, 7 pages.
A. Adumitroaie et al., "Beyond Plain Weave Fabrics—I. Geometrical Model", 2011, 20 pages.
International Search Report and Written Opinion, PCT/US2016/019068, dated Jun. 3, 2016.
International Search Report and Written Opinion, PCT/US2016/052822, dated Feb. 2, 2017.
USPTO Office Action in U.S. Appl. No. 15/761,514 dated Oct. 18, 2019.
USPTO Office Action, U.S. Appl. No. 15/761,514, dated Jul. 5, 2022 (7 pages).
International Search Report and Written Opinion of International Application No. PCT/US19/66913, dated Jun. 15, 2020 (13 pages).
USPTO Office Action, U.S. Appl. No. 15/552,868 dated Dec. 13, 2019.
USPTO Office Action, U.S. Appl. No. 15/761,514, dated Sep. 14, 2020 (11 pages).
USPTO Office Action, U.S. Appl. No. 15/761,514, dated Feb. 7, 2022 (9 pages).
USPTO Office Action, U.S. Appl. No. 15/552,868 dated Oct. 15, 2020 (11 pages).
USPTO Office Action, U.S. Appl. No. 15/552,868 dated Jan. 13, 2022 (13 pages).
USPTO Office Action, U.S. Appl. No. 15/552,868, dated Aug. 16, 2022 (12 pages).
USPTO Office Action, U.S. Appl. No. 15/761,514, dated Sep. 22, 2022 (14 pages).

* cited by examiner

METHOD AND APPARATUS OF MAKING PIPES AND PANELS USING A TREATED FIBER THREAD TO WEAVE, BRAID OR SPIN PRODUCTS

CROSS-REFERENCE TO RELATED APPLICATIONS

This application claims the benefit of U.S. Provisional Application No. 62/119,497, filed Feb. 23, 2015, which is hereby incorporated by reference in its entirety.

BACKGROUND OF THE INVENTION

There are many materials available according to the art that can provide tensile strength, caustic resistance and/or conductivity that would be suitable for use in manufacturing pipes and other products. However, each of the materials according to the art have drawbacks, including but not limited to their cost for manufacturing or shipping, their weight, their resistance to heat and other harsh environments, and their variability in manufacturing in order to alter the material's properties in the manufacturing process. The present invention seeks to address these shortcomings in the art by providing a fibrous material formed from a base threaded fabric of one or more materials that provides a durable and lightweight material that can be used in the creation of pipes or many other applications.

SUMMARY OF THE INVENTION

The present invention relates to the fields of materials and pipes made from woven, knitted, spun or braided fiber threads that provide high tensile strength and caustic resistance. Examples of products that can be made from the material in accordance with the present invention include, but are not limited to: pipes, water pipes, oil pipes, well casings, armor, bullet-proof vests, vehicle or airplane bodies, mufflers, gas tanks, manifolds, heat exchangers, boilers, air bags, clothing, footwear, building materials, consumer products, thermal or electrical insulators and shipping containers.

According to a first aspect of the present invention, a fibrous material is provided comprising a fabric layer made from fiber thread; and an epoxy resin bound to the fiber thread. The fabric layer is saturated in the epoxy resin to bind the epoxy resin to the fiber thread while the fabric layer is created from the fiber thread or after the fabric layer is created from the fiber thread. The fabric layer can be created by weaving the fiber thread into a woven material; by spinning the fiber thread into a spun material; by knitting the fiber thread into a knit material; or by braiding the fiber thread into a braided material. According further to the first aspect of the invention, fiber thread can be made from a fiberglass material, a basalt material, or an alternative material.

According further to the first aspect of the invention, the fibrous material further may comprises additive materials configured to adjust one or more properties of the fibrous materials, the properties including one or more of thermal or electrical conductivity, surface friction, cure time of the material during manufacture or improving the binding of the epoxy resin to the fiber threads. The one or more of the additive materials can be combined with the epoxy resin and are applied to the fiber threads simultaneous with the epoxy resin. Additionally or alternatively, one or more additive materials are applied to the fiber threads separately from the epoxy resin. The fibrous material can be configured to have at least two sections along the material configured with different properties, including one or more of, thermal or electrical conductivity, surface friction or structural integrity.

According further to the first aspect of the invention, the epoxy resin of the fibrous material comprises polyamides, bismaleimides and cyanate esters.

According further to the first aspect of the invention the fabric material may be formed into the shape of a pipe.

According to a second aspect of the present invention, a method for creating a fibrous material is provided. The method comprises forming a fabric layer from a fiber thread; and binding an epoxy resin to the fiber thread. The method may further comprise saturating the fabric layer in the epoxy resin to bind the epoxy resin to the fiber thread after the fabric layer is formed from the fiber thread or simultaneous with the formation of the fabric layer. According to the second aspect of the invention, forming the fabric layer may comprise weaving the fiber thread into a woven material; forming the fabric layer comprises spinning the fiber thread into a spun material; by knitting the fiber thread into a knit material; or braiding the fiber thread into a braided material. According further to the method of creating fibrous material in accordance with the second aspect of the invention, the fiber thread can be made from a fiberglass material, a basalt material or an alternative material.

According further to the method according to the second aspect of the invention, the method further may further comprise providing additive materials configured to adjust one or more properties of the fibrous material, the properties including one or more of thermal or electrical conductivity, surface friction, cure time of the fibrous material during manufacture or improving the binding of the epoxy resin to the fiber threads. The method may further comprise combining one or more additive materials with the epoxy resin and applying the additive materials to the fiber threads simultaneous with the epoxy resin. Additionally or alternatively, the method may further comprise applying one or more additive materials to the fiber threads separately from the epoxy resin. According to certain embodiments of the method of the second aspect of the invention the method may further comprise providing the fibrous material with at least two sections along the fibrous material configured with different properties.

According further to the second aspect of the invention, the epoxy resin may comprise polyamides, bismaleimides and cyanate esters.

According to an embodiment of the method of the second aspect of the invention, the fibrous material can be formed into the shape of a pipe.

DETAILED DESCRIPTION OF THE DRAWINGS

The present invention will now be described with reference made to the Figures.

According to the present invention, a fibrous material and method of manufacturing the same is provided by spinning, knitting, braiding or weaving a fibrous material treated with an epoxy resin.

According an exemplary method for creating the material or pipe according to the invention, material or pipe is woven from the fibrous thread and is saturated with the epoxy resin, before being cured to harden into a durable material that can be used in a variety of applications.

A fiber thread is used that is grooved or cut, which allows epoxy adhesive, which can be made primarily of similar material as the thread, to reside internally in the threads to mechanically and chemically bond the joint between fiber threads. The possible fiber base materials include basalt, stainless steel, steel, iron, aluminum, carbon fiber, Teflon, polypropylene (PP), polyethylene (PE), fiberglass such as E-glass, urethane and S-2.

The fiber material allows multiple processing and design formats for combining with the epoxy resin, including spray, transfer molding, soaking or encapsulation to ensure complete adherence and strength created by the use of the base material.

The epoxy resin is used to encapsulate or saturate the woven, non-woven or blended materials and creates a material capable of withstanding high temperatures and pressures, which outperforms prior art materials.

The epoxy resin may consist of 25-75% (by volume) polyamides, 5-25% (by volume) bismaleimides and 2-7% (by volume) cyanate esters. Filler materials can also be included in the volume of the epoxy resin. By mixing these components and adding additive materials, and then treating fiber with the resulting combination, variable product characteristics can be achieved. By adjusting the additives, the product characteristics change. An advantage of the epoxy resin is its high heat capability and the ability to change the heat and electrical conductivity of the woven or spun products, while maintaining the tensile strength of the fiber used.

Additives, such as in the form of fine spheres and/or powdered material, can be mixed with the epoxy base materials to adjust the epoxy resin to the required product specifications.

The additives listed in Table 1 can be used with the epoxy resin to adjust the product characteristics required, and can be used with any of the aforementioned fiber base materials.

TABLE 1

Additives and Respective Primary Impact

| Additive | Impact |
| --- | --- |
| Phenolics (micrometer spheres) | Insulation (Thermal & Electric) Filler |
| Benzoxazines | Low conductivity-Increase adhesiveness |
| Phthalonitrites (micrometer spheres) | High conductivity |
| Xeon gas | Allows low temperature |
| Molybdenum disilicide (coating) | Reduce cost/friction |
| Boron nitride (coating) | Reduce cost/friction |
| Methyl | Cure time |
| Cyanoacrylate | Cure time |

The epoxy resin base materials and additives are mixed under a process that controls the production of a strong epoxy bond to the chosen fiber. In one embodiment, the epoxy resin can be sprayed on the mantle of an extrusion or spinning pipe machine or weaving machine, and in doing so, the epoxy resin can be mixed and adjusted with additives of to achieve the planned product specifications. As previously described, the epoxy resin can also be applied to the fiber thread using other methods.

An important condition that must be met is the adhesion of the spheres that conduct or reject thermal transfer via the epoxy resin. This is accomplished by using an epoxy formula that controls the makeup of the material to achieve a product that has excellent resistance to moisture, oxidation, alkaline, shock, acid and solvent. Full encapsulation is accomplished by adding or reducing plasticizers formulated in the epoxy resin.

For high-speed coatings, an epoxy formula of methyl-based or cyanoacrylate-modified additives may be used to adjust the cure time of the product. Each of the coatings positively affects the barcol hardness and fluid dynamics of the surface conditions on the material. Coatings may be applied internally and/or externally to the surface during production. The additives combined with epoxy resin can create adhesion and eliminate the potential of dry lamination between the epoxy and the fabric.

Standard temperature capability ranges may be accomplished, ranging from 250° C. to 700° C. The temperature capability of a planned product can be achieved by parametric entry of data that will instruct the machine manufacturing the material how to control the mixing and application of additives and coatings. The machinery used for creating the material is provided with sensors that verify the adjustments required for each mix and use of the epoxy resin. These sensors may be placed at the extruding location and the form controlling section of the machinery.

Extreme temperature requirements for the finished material may result in an adjustment in the epoxy resin formula, causing some additives to be titanium carbide-based, which will allow for the capacity to reach extreme high temperatures and extreme pressures. Temperature resistances may be reached as high as 2800° F. and can be adjusted to match the requirements of the application.

Sensors, including X-ray and spectral analysis, can determine the chemical reaction within the interchange of the epoxy, the additives and the coatings applied during extrusion. Viscous flow and crystallization may be determined during sample or pilot production once the data has been entered and the epoxy formula is adjusted. Distortion of the crystallization alignment and its orientation are verified and tested during this inspection.

The methods of the present invention for creation of the epoxy resin with additives allows for the adjustment and control of the flexibility, the modular strength, the sheer, the tensile stress capacities and the complete control of the exposure to high temperature or temperature variances.

Esther linkages may be adjusted by material augmentation to create post-cure relaxation of the combination of epoxy resin and fiber formed in the shape of a round pipe or woven fabric. Off-gas and post-cure time are dependent upon the formula and catalyst of the epoxy resin.

The epoxy resin uses standard, known high temperature materials with the addition of thermal adjustable, encapsulated, coatings and bonded shapes that allow fiber and connectivity to work toward a superior energy output. Cost and existing conditions may be applied to each extrusion.

The thickness, weight and modulus density of the epoxy resin may be reduced to less than the comparative alternative materials. This epoxy fabric material will be adjustable to depth pressure gradients as seen in field applications. The transfer of heat specifically may be customized and tuned to match the requirements and output unit to generate energy.

Coatings of the epoxy resin that are applied to the material post-cure may be derived of boron nitride or molybdenum disilicide, capable of withstanding temperatures well over 1000° C. to 1200° C. The coating can reduce production cost and reduce friction inside of a pipe or material surface, and be impregnated directly into the epoxy and fabric.

Using the epoxy resin with fillers and additives to create thermal and electric conductivity or non-conductivity, the result can be designed and changed dynamically by varying the percentages of the additives used to create the epoxy. Designed filler materials can be added that will not weaken the composite but add to the variability of the result. Filler materials can be included with the epoxy resin particularly where the cost of the epoxy resin used is high, to reduce the amount of epoxy resin required. Use of the materials and the additives will control mixing, hardening and surface conditioning that will allow for the adjustment to create custom pipes or material weaves to meet each environmental condition and location required for a product.

As the fibrous material is created, different sections of the material can be treated with different epoxy resins mixed with different additives. As a result, the properties of the material can be varied along the length or surface area of the material. For example, different sections of pipe can be configured to have different levels of thermal conductivity. Epoxy resin ingredients and formula may be blended to thermally adjust to temperature retention or temperature conductivity.

The fibrous thread-like material is woven, knit, braided or spun into a fabric that forms the underlying material. Different weaves, braiding and spinning formations change the performance of the products, examples of which are shown in FIGS. 2a-4b. For example, a woven or braided fabric has a higher tensile strength than a spun fabric.

Figure 1:
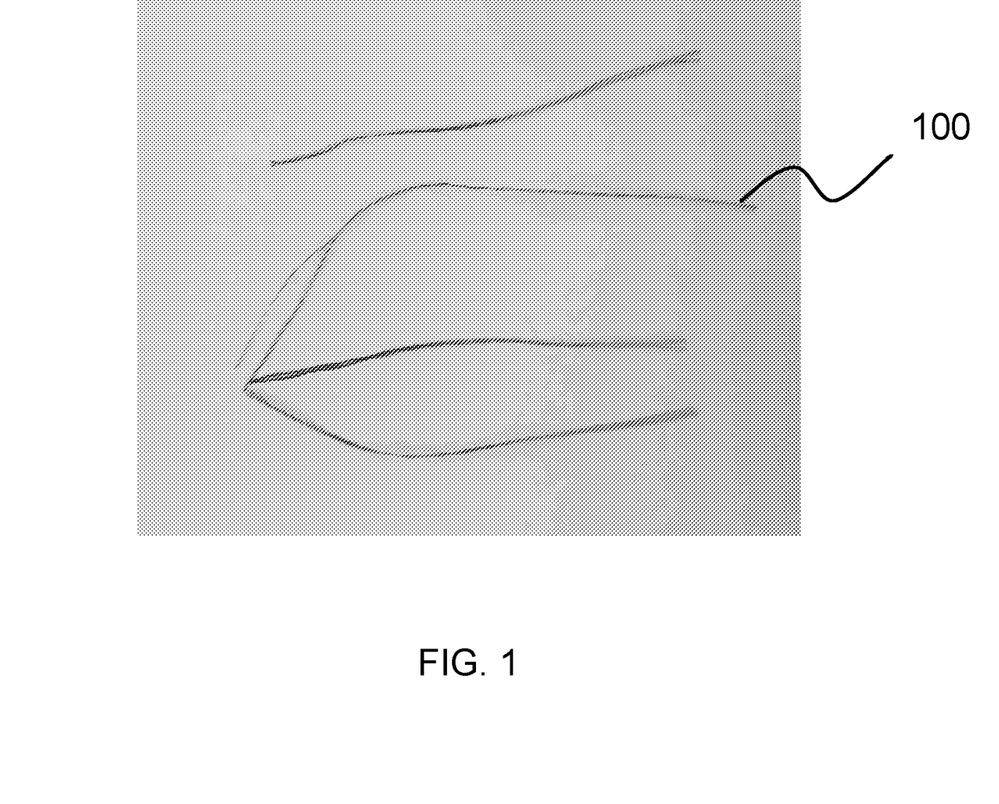
FIG. 1 shows an example of a filament fiber in accordance with the present invention.
Figure 2A:
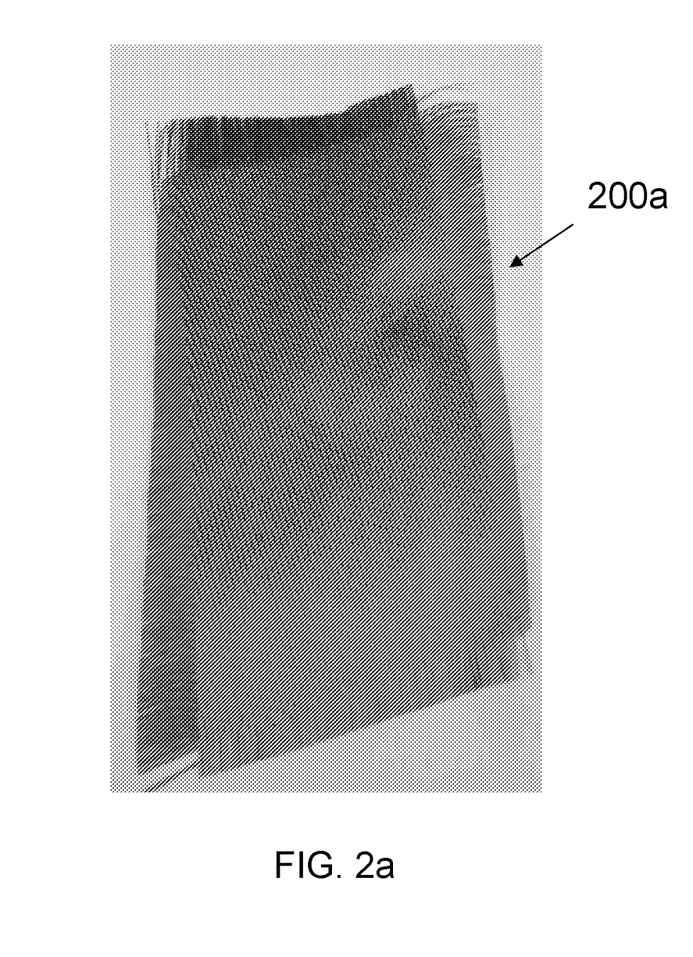
FIG. 2a shows an example of a satin weave of fiber filament without epoxy resin, in accordance with the present invention.
Figure 2B:
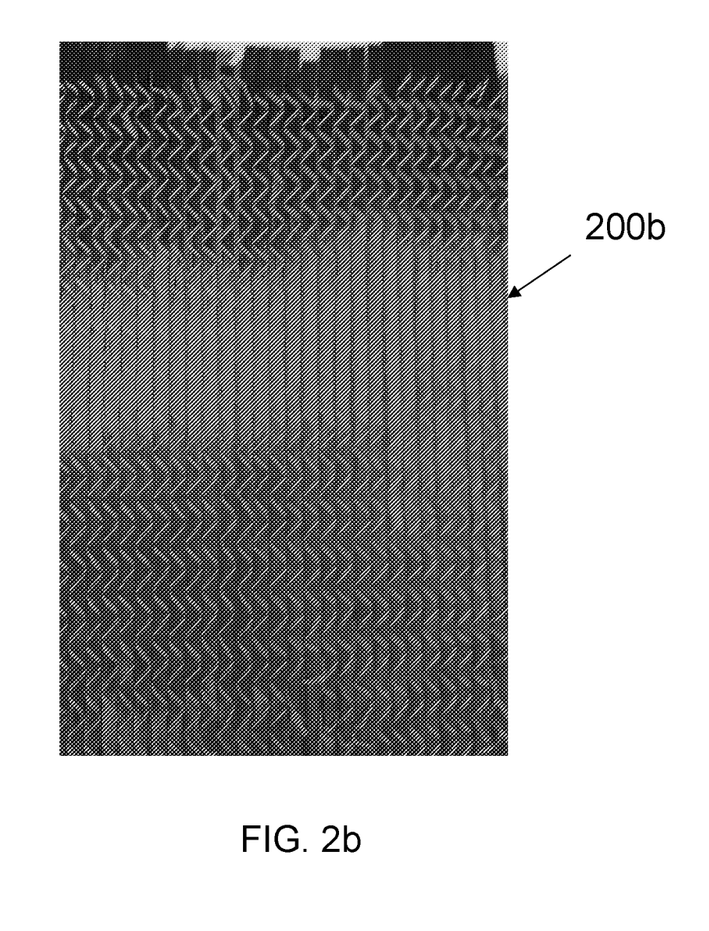
FIG. 2b shows an example of a tri-axial weave of a fiber filament without epoxy resin, in accordance with the present invention.

FIG. 2a shows a satin fabric weave 200a, woven with nine micron basalt filament. The fabric is shown without epoxy resin so as to better show the woven structure. In FIG. 2b, a tri-axial fabric weave 200b is shown, woven with thirteen micron basalt filament, without epoxy resin.

Figure 3A:
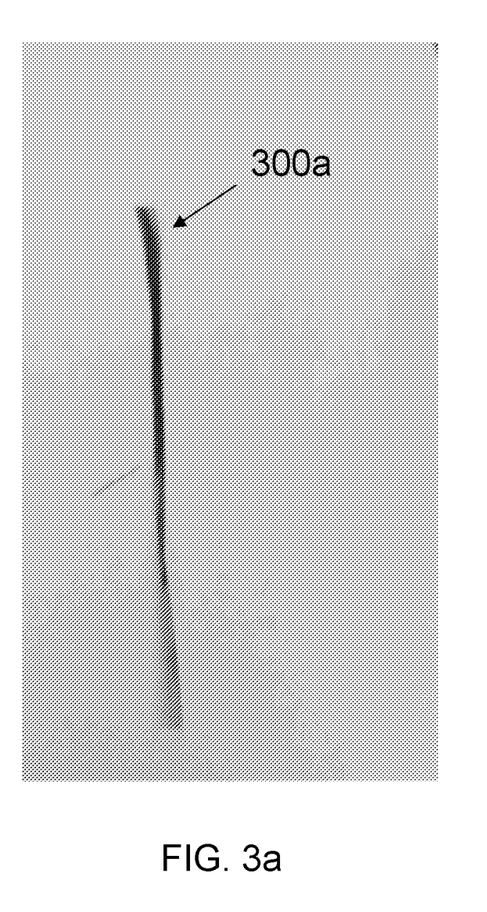
FIG. 3a shows an example of a bundled fiber filament without epoxy resin, in accordance with the present invention.
Figure 3B:
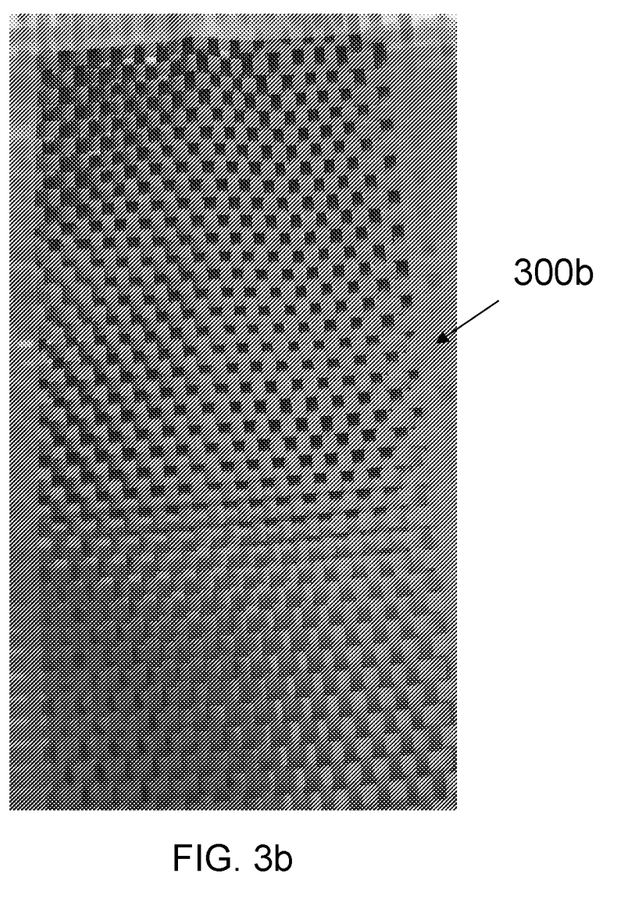
FIG. 3b shows an example of a bundled fiber plain weave of fiber without epoxy resin, in accordance with the present invention.

FIG. 3a shows a bundled eleven micron basalt filament 300a. In FIG. 3b, a plain weave 300b is shown using bundled basalt fiber filament, such as bundled filament 300a. The plain woven fabric 300b of FIG. 3b is shown without epoxy resin.

Figure 4A:
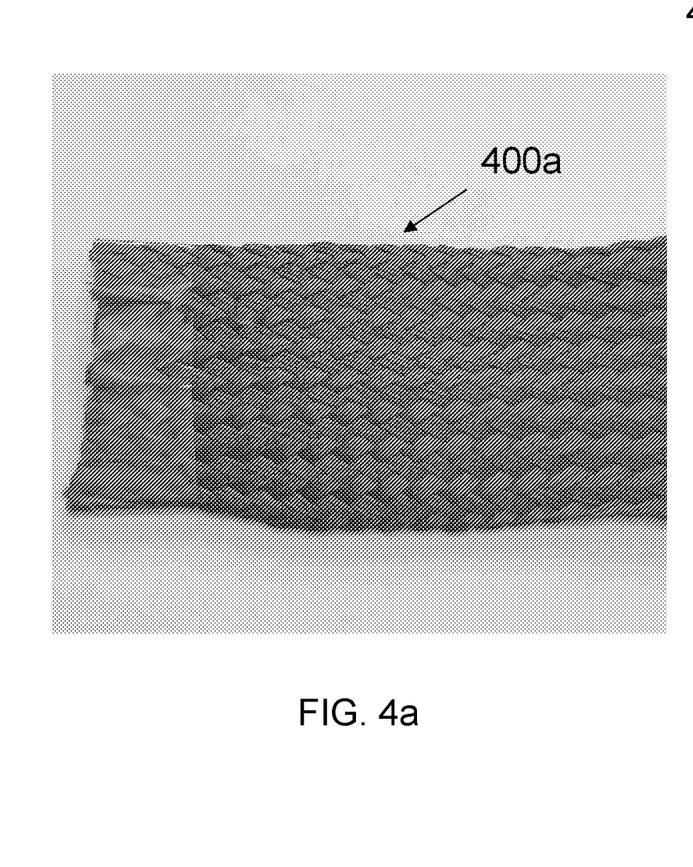
FIG. 4a shows a first example of a biaxial braided pipe of twisted yarn without epoxy resin, in accordance with the present invention.
Figure 4B:
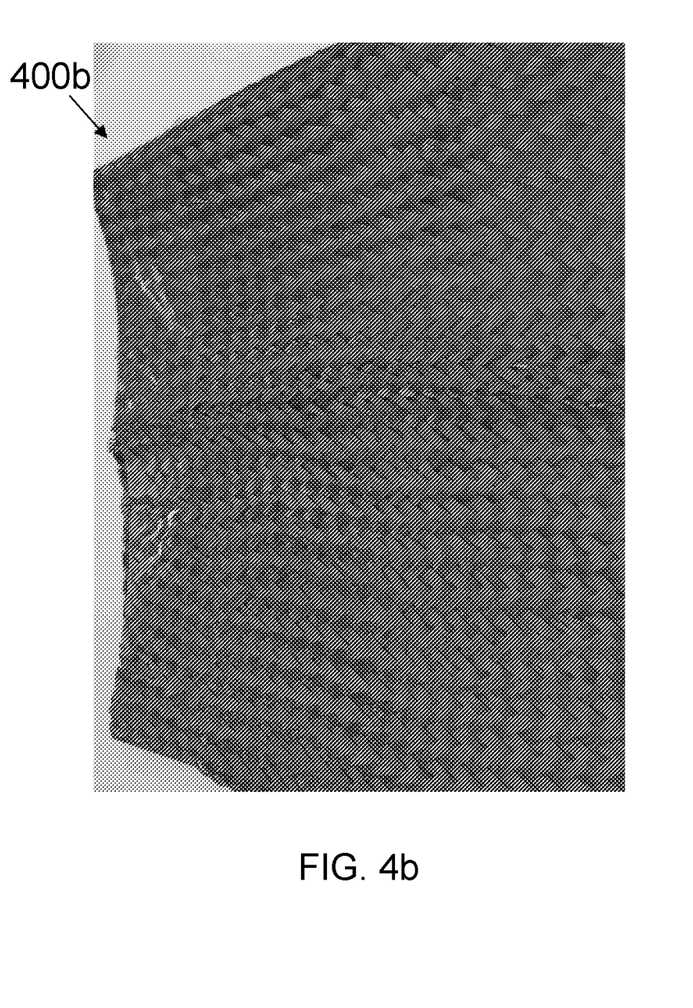
FIG. 4b shows a second example of a biaxial braided pipe of twisted yarn without epoxy resin, in accordance with the present invention.

FIGS. 4a and 4b show examples of biaxial braided fabric structures without epoxy resin for clarity. FIG. 4a shows a biaxial braided pipe 400a having a diameter of five centimeters, woven from basalt twisted yarn. FIG. 4b shows a biaxial braided pipe 400b having a diameter of twenty centimeters, woven from basalt twisted yarn.

Structures woven, braided or spun in such a way, with any of the fiber base materials described herein shown by way of example, allow for multiple processing and design formats for incorporating epoxy resin including spray, transfer molding, soaking or encapsulation to ensure complete adherence and strength created by the use of this base material.

Figure 5:
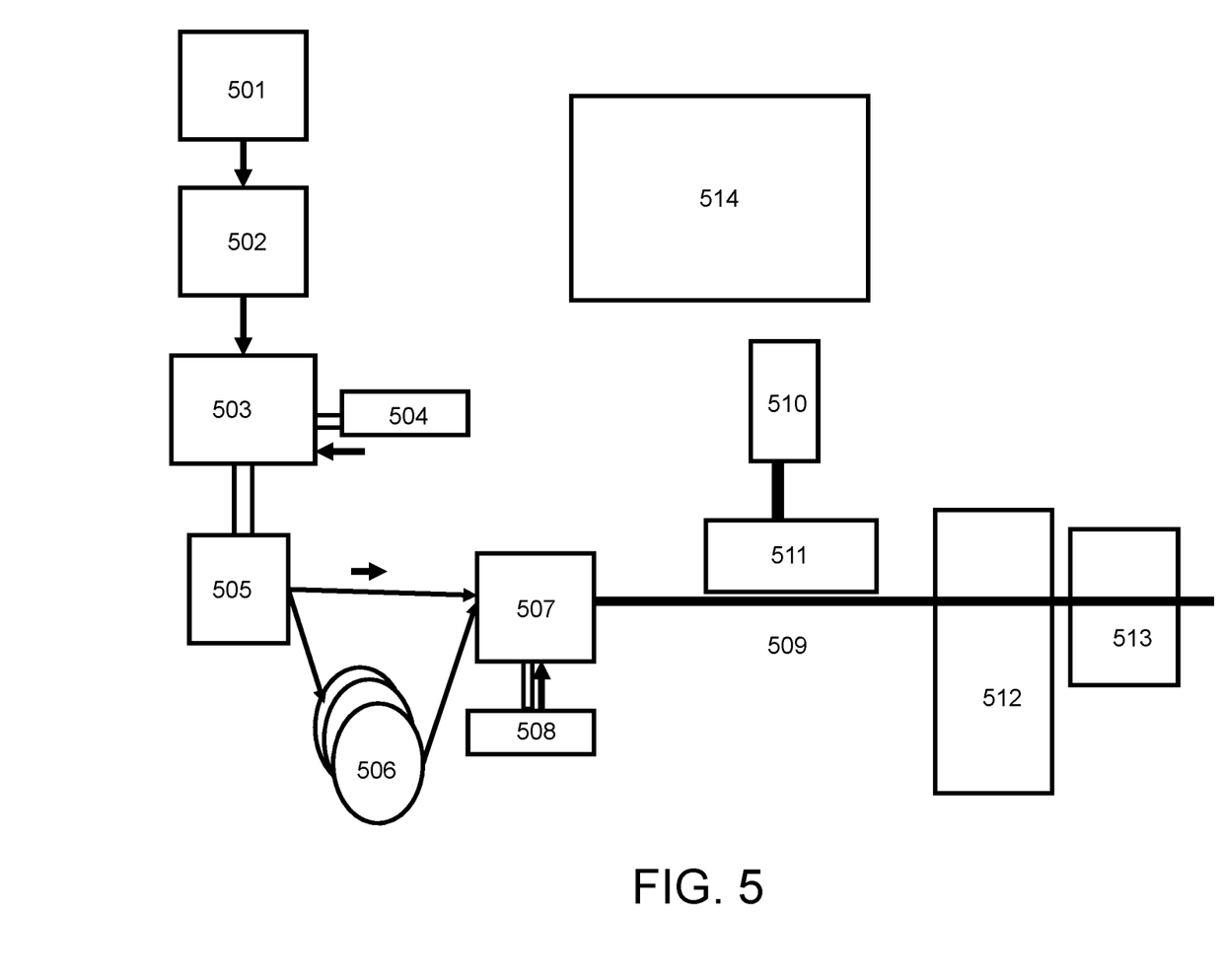
FIG. 5 shows a process for manufacture of fiber material in accordance with an embodiment of the present invention.
Figure 6:
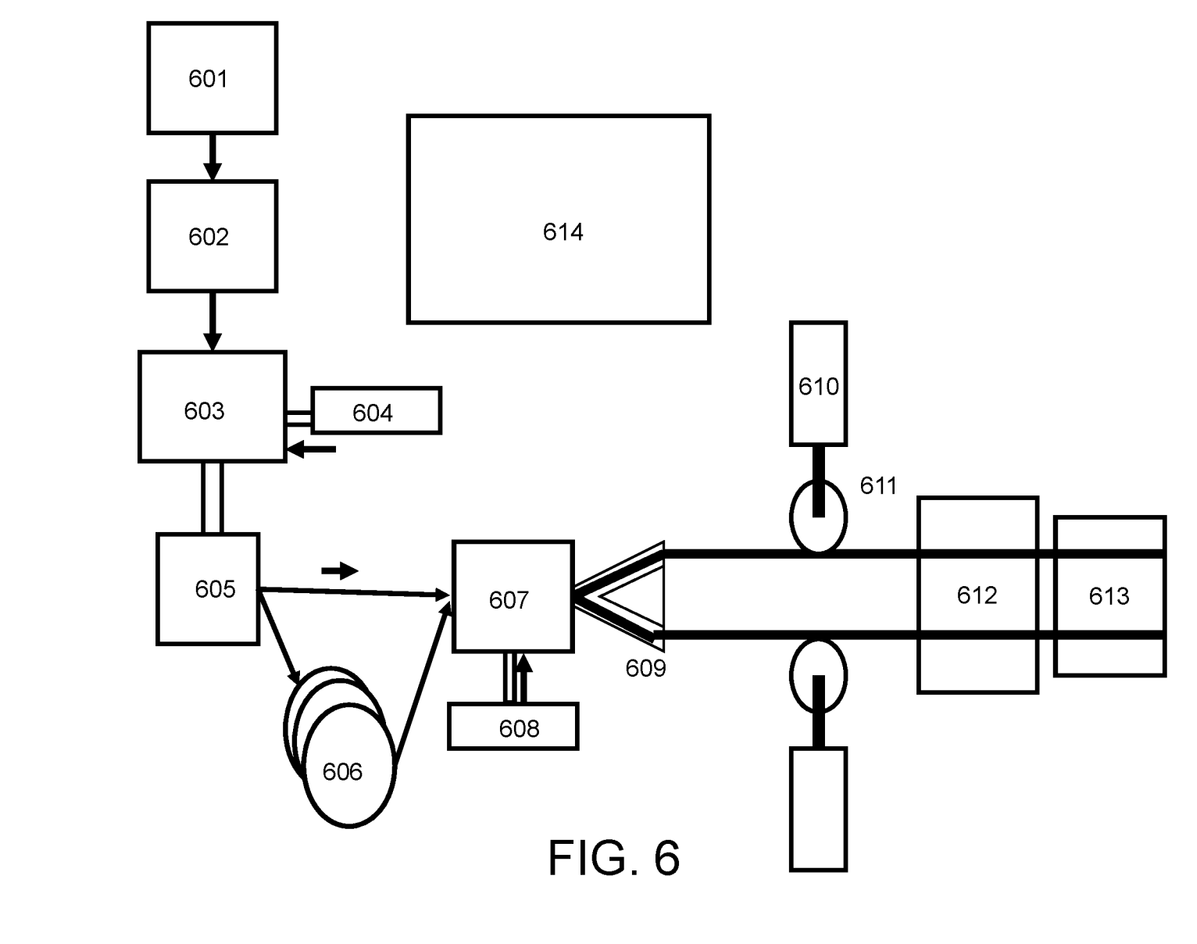
FIG. 6 shows a process for manufacture of pipe in accordance with an embodiment of the present invention.

In accordance with the present invention, machines are designed for filament winding, production of pipe and weaving of fabric. Examples are shown in FIGS. 5 and 6 as well as FIGS. 7a and 7b.

The machinery for creating the pipe structure from the material in accordance with the invention may include a rotating mandrel, plate, beams and may also include an inspection station. Such a machine supports filament placement at varying axes and rotations around the spinning mandrel.

Before spinning or weaving a filament, the filament may be preconditioned and saturated through a bath of epoxy resin formulated with two parts to activate its cure time. As the filament approaches the mandrel or the weaving point, injection ports may be provided to inject or spray thermally conductive (or non-conductive) spheres or powdered materials. Inspection and visual control may be fed back to one or more control systems to control the buildup thickness, strength, elasticity, and size as the pipe or fabric is manufactured. This process is continuous or runs for as long as the materials are provided. The control systems can be programmed to accept and adopt multiple choices of thermally conductive (or non-conductive) material.

According to the present invention, a continuous supply of filament, which can be spooled by a creel of materials chosen by the consumer specifically for an applicable use and site. Before the continuous filament is wound around the mandrel or used for weaving, there are various options for epoxy and filler for attachment to the filament. Full inspection may be conducted through visual sensors, spectral sensors, off gas sensors and other hyper spectral detection methods. The machine process and sensor process controls the hardening and coating to ensure the correct ground insertion and flow characteristics. The control may provide that no harmful off gases are created during the manufacturing process.

The pipes made from the fiber material can be continuously formed at their full, desired length during the time of use. Pipes can be manufactured at fixed lengths and seamed or welded as one. Pressure variances will not affect the splicing or lamination to create the extreme length required of these pipes. The pipes can also be manufactured in the field to create seamless installations. Pre-woven, braided or spun fabric pipes or material can be spooled and shipped prior to application of the epoxy resin, and the pipe or material manufacturing can be completed on-site. Similarly, spooled threads of fibrous material can be provided for use in manufacturing the pipe or material on-site.

Wrap angles are variable on such machines, and allow for adjustment of strength in coordination with pressure and strength requirements. Filament density enhances the wrap angle to accomplish additional strengths.

Machinery required to create the pipes from its woven material may be small and portable. Such portable manufacturing machines can be moved to a jobsite so the logistic cost of production can be greatly reduced. Such production machines will have elongation, non-conductivity or conductivity properties, high specific strengths and elastic energy absorption. Pressure resistance may be created by modification within the program of such a machine.

Because epoxy resin is embedded in the fabric, machined threading may be applied so as to enable splicing if necessary. These machined ends can be accomplished on the machine to the API 5B standard. In this way, breakage and failure will be at a minimal. Inspection may be maintained during the construction of material, pipe or other of any form of application to ensure quality.

Use of fillers and additives to create thermal and electric conductivity or non-conductivity can be designed and changed dynamically during the manufacturing process. Fillers of materials can be added that will not weaken the composite, but add to the variability of the result. Use of materials and their additives that will control mixing, hardening and surface conditioning will allow for the adjustment to create custom pipe or material weave to meet each environmental condition and location.

FIG. 5 shows an exemplary manufacturing process used for creating fibrous material, and FIG. 6 shows an exemplary manufacturing process used for pipes made of the fibrous material. Both figures include the process for creating the required fiber thread. These methods can be performed using any combination of the techniques (knitting, braiding, spinning or weaving), and fiber base materials, additives and epoxy resin described herein, or other materials that a person of skill in the art would find suitable for achieving the same purpose.

FIGS. 5 and 6 depict machinery that produces fiber pipe and woven material seamlessly to meet the following submitted flexible parameters: length, tensile strength, diameter, thickness, thermal characteristics, electrical characteristics, chemical resistance, flexibility, capacity, pressure, portability.

The amount of additives to achieve particular advantages may vary in cost and application. The combination of fibrous material with epoxy resin and additives allows material design to match different applications and thus reduce the high cost previously associated with pipe processing. The cost of both an epoxy-based high temperature resin and a high temperature fiber will allow low-cost and high-volume manufacturing of pipe.

Referring to FIG. 5 in detail, each of the numbered steps in a process for manufacturing fibrous material is shown as follows:

In step 501, the initial fiber material is collected and provided to the manufacturing machinery. In a preferred embodiment, the initial fiber material can be E-glass. Other materials may be used in further embodiments, such as basalt, stainless steel, steel, iron, aluminum, carbon fiber, Teflon, polypropylene (PP), polyethylene (PE), urethane and S-2. In step 502, the material is crushed by a crusher and treated. The crushed and treated material is then provided to a centrifuge, where it is spun and heated in step 503. While the material is being spun in the centrifuge, any additive materials that are to be included in order to alter one or more properties of the final product as described previously can be added in step 504. After the fiber material is spun and heated in step 504, in step 505, a thread die forms the fiber into a thread. Prior to beginning the material formation process, the fiber thread can be spooled in step 506. Alternatively, the fiber thread can be fed directly into the material formation process.

In step 507, the thread is woven, knit, spun or braided into material the size of the material is dependent on the capabilities of the weaving process. The dimensions of the material are determined by the weaving process. Different weaving techniques and machines are used for different material sizes. In step 508, the epoxy resin and additives can be supplied as previously described herein, to saturate the thread while it is being spun, braided or woven. The epoxy resin can be applied to the fiber threads while the material is being woven, spun or braided, or applied after the pipe is formed. The epoxy resin may also be mixed with one or more additives and applied to the thread. Further, one or more additives can be applied to the fiber thread prior to material formation.

The completed and uncured material, if necessary, can now be shaped in step 509. A hydraulic press produces force 510 against a stamping tool that shapes the material. In step 511, the stamping tool applies force to shape the soft material. After the shaping, the curing, coating and sensor insertion occur, as needed by the material to be formed, in step 512. Coatings can enhance the features of the material while in use. Sensor insertion can create material that can report back information during operating conditions. Curing can vary depending on the composition of the pipe which could include ultraviolet treatment, heat treatment or other methods of curing. In step 513, the material can be cut into the proper lengths or dimensions. Cutting does not occur in certain instances, such as if creating rolls of material.

A control system 514 monitors and controls all the steps in the fabrication process. It accepts control input (parameters) for the timing and control of all events. The control system may comprise a non-transitory computer readable medium stored with a computer program and a processor configured to cause the execution of the program, which specifies the buildup construction of each and every product. The program can vary the fiber, the epoxy, the catalysts and open time as well as thermal condition specifically located on each and every product.

Referring now to FIG. 6 in detail, each of the numbered steps in a process for manufacturing fiber pipe is shown as follows:

In step 601, the initial fiber material is collected and provided to the manufacturing machinery. In a preferred embodiment, the initial fiber material can be E-glass. Other materials may be used in further embodiments, such as basalt, stainless steel, steel, iron, aluminum, carbon fiber, Teflon, polypropylene (PP), polyethylene (PE), urethane and S-2. In step 602, the material is crushed by a crusher and treated. The crushed and treated material is then provided to a centrifuge, where it is spun and heated in step 603. While the material is being spun in the centrifuge, any additive materials that are to be included in order to alter one or more properties of the final product as described previously can be added in step 604. After the fiber material is spun and heated in step 603, in step 605, a thread die forms the fiber into a thread. Prior to beginning the pipe formation process, the fiber thread can be spooled in step 606. Alternatively, the fiber thread can be fed directly into the pipe spinning, weaving, braiding or knitting process.

In step 607, the thread is formed into a pipe. The thread can be knit, braided, woven or spun into a number of patterns as previously described, including plain, satin, twill, crowfoot, flat, biaxial or tri-axial. The diameter of the pipe is dependent on the changeable mandrel (609). A different mandrel is used for different pipe sizes. In step 608, the epoxy resin and additives can be supplied as previously described herein, to saturate the thread while it is being spun, braided or woven. The epoxy resin can be applied to the fiber threads while the pipe is being woven, spun or braided, such as by coating the mandrel, or applied after the pipe is formed. The epoxy resin may also be mixed with one or more additives and applied to the thread. Further, one or more additives can be applied to the fiber thread prior to pipe formation.

The completed and uncured pipe, if necessary, can now be shaped. A hydraulic press produces force 610 against the rollers that shape the pipe. In step 611, rollers may be used to apply force to shape the soft pipe. The shape of the pipe may vary depending on the number of rollers utilized. Two rollers create an oblong shape, three rollers create a triangular shape and four rollers create a rectangular shape. After the shaping of the pipe, curing and coating of the pipe and potential sensor insertion occurs in step 612. Coatings can enhance the features of the pipes. Sensor insertion can create a product that can report back information during operating conditions while the pipe is in use. Curing can vary depending on the composition of the pipe which could include ultraviolet treatment, heat treatment or other methods of curing. In step 613, the pipe can be cut into the appropriate lengths. Cutting does not need to occur in certain instances; such as if the pipe created is for laying continuous pipe with a portable fabrication unit.

A control system 614 monitors and controls all the steps in the fabrication process. It accepts control input (parameters) for the timing and control of all events. The control system may comprise a non-transitory computer readable medium stored with a computer program and a processor configured to cause the execution of the program, which specifies the buildup construction of each and every product. The program can vary the fiber, the epoxy, the catalysts and open time as well as thermal condition specifically located on each and every product. The control system 514 or 614 can be configured to: thin, thicken and change weave orientation dynamically per entered parametric values to create strength, flexibility and thermal characteristics; monitor temperature, density and refresh rates for quality control; be parametrically controlled for external input to build pipe and/or material to exact performance requirements; match flow rate to maintain thermal range, tension of surrounding materials, corrosive resistance and other properties to insure product stability; compensate for angle, depth and longevity via surface tension; allow for dynamic shape adjustments to allow for product variability; allow for a unique die design during manufacturing of the material for product shaping; allow for variable curing techniques like: ultra-violate, heat and chemical treatment; allow for coating of one or both sides of the pipe and/or material for additional performance features; allows for designed pushing or insertion pressure at the mandrel to control and balance the process to eliminate any damage; allow for the cutting or continuous fabrication depending on requirements; allow for product use immediately after fabrication with an initial cure period of, for example, 24 hours and permanent curing after, for example, 7 days; and allow for pultruding or extruding at high feed rate.

Figure 7A:
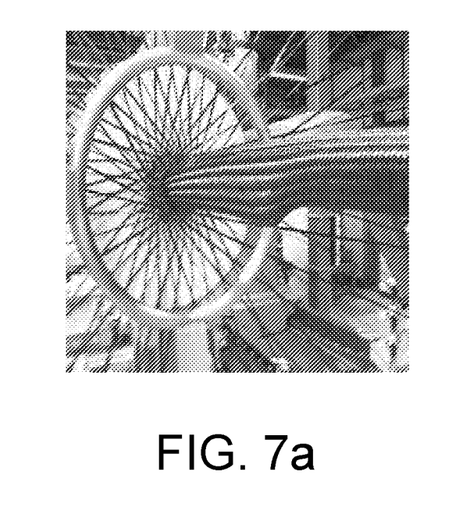
FIG. 7a shows an example of braiding pipe in accordance with the present invention.
Figure 7B:
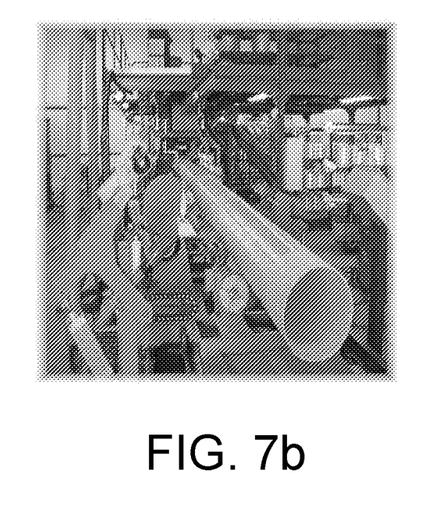
FIG. 7b shows an example of spinning pipe in accordance with the present invention.

FIG. 7a shows a braiding pipe process and FIG. 7b shows a spinning pipe process.

The product characteristics, which can vary depending on the presence of further additives, include: high strength, light weight, stability, moisture, fire and chemical resistance, thermal and electric conductivity, adjustable thermal conductivity, elasticity, resistance to stress corrosion, resistance to oil field chemicals, easy spooling, on-site manufacturability, ductile behavior, flexibility, cost effectiveness, high elongation, elastic energy absorption, resistance to electromagnetic interference, variable insulation property and zero delamination potential.

Example characteristics of a fibrous material and pipe made from a basalt fiber are shown in Tables 2-4.

TABLE 2

| Material Characteristics | |
| --- | --- |
| Melting Point (lava) | 2800° F. |
| Operating Range | −40 C. to 580° C. |
| Surface Density | 140-380 g/m$^2$ |
| Thickness | .05 inches (or variable) |
| Breaking Load | 500-1400 kg |
| Flexural Strength | 110-134+ ksi |
| Width standard | 4.0-120 inches |
| Width optional | 4.0-120 inches |
| Plain weave | 1 thread × 1 thread, 5 threads × 3 threads |
| Twill weave | 2 threads × 1 thread, 3 threads × 1 thread, 5 threads × 3 threads |
| Crowfoot weave | 1 thread × 1 thread, 5 threads × 3 threads |
| Flat weave | 4 threads × 5 threads |
| Bi-axial | 5 threads × 5 threads |

TABLE 3

| Pipe Characteristics | |
| --- | --- |
| Melting Point | 2,800° F. |
| Operating Range | −40 to 580° C. |
| Pipe diameter | 1 inch to 80 inches |
| Surface density | 140-380 g/m$^2$ |
| External Pressure | 7,800 psi |
| Internal Pressure | 40-500 bar (580-12,250 psi) |
| Thickness | Variable |
| Breaking Load | 500-1400 kg |

According to the teachings hereof, by using advanced fiber and material concepts to create products, such as pipes, there is a significant reduction in the weight and cost of the product, and a significant increase in strength and caustic/abrasion resistance. Table 4 shows a listing of chemicals and temperatures at which the woven material according to the invention did not suffer any attack.

TABLE 4

| Causticity Testing | |
| --- | --- |
| Chemical | Temperature (° C.) |
| Ammonia Liquid | 250 |
| Acetic Acid (Conc.) | 200 |
| Benzene | 100 |
| Brake Fluid | 250 |
| Ethylene Glycol (50% Aq.) | 250 |
| Hydrochloric Acid (12%) | 100 |
| Hydrogen Sulfide (gas) | 250 |
| Hydraulic Fluid | 30 |
| Heavy Aromatic Naphtha (100%) | 250 |
| Jet A Fuel | 30 |
| Methanol | 100 |
| Methane Gas | 250 |
| Petroleum Oil | 100 |
| Sea Water | 250 |
| Sodium Bisulfite (50% Aq.) | 250 |
| Sodium Hydroxide (50%) | 250 |

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice.

What is claimed:

1. A fibrous material comprising:
a fabric layer made from fiber thread; and
an epoxy resin bound to the fiber thread;
the epoxy resin comprises polyamides, bismaleimides and cyanate esters.

2. A fibrous material in accordance with claim 1, wherein the fabric layer is saturated in the epoxy resin to bind the epoxy resin to the fiber thread during or after making the fabric layer from the fiber thread.

3. A fibrous material in accordance with claim 2, wherein the fabric layer is created by weaving the fiber thread into a woven material.

4. A fibrous material in accordance with claim 2, wherein the fabric layer is created by spinning the fiber thread into a spun material, or braiding the fiber thread into a braided material.

5. A fibrous material in accordance with claim 2, wherein the fiber thread is made from a fiberglass material or a basalt material.

6. A fibrous material in accordance with claim 1, further comprising one or more additive materials configured to adjust one or more of thermal or electrical conductivity of the fibrous material, and the one or more additive materials comprise one or more of phenolics, benzoxazines, or phthalonitrites.

7. A fibrous material in accordance with claim 6, wherein the fibrous material is configured with at least two sections along the fibrous material configured with different properties.

8. A fibrous material in accordance with claim 2, wherein the fabric material is formed into the shape of a pipe.

9. A method for creating a fibrous material, comprising:
forming a fabric layer from a fiber thread; and
binding an epoxy resin to the fiber thread
wherein the epoxy resin comprises polyamides, bismaleimides and cyanate esters.

10. A method for creating a fibrous material in accordance with 9, further comprising saturating the fabric layer in the epoxy resin to bind the epoxy resin to the fiber thread after the fabric layer is formed from the fiber thread or simultaneous with the formation of the fabric layer.

11. A method for creating a fibrous material in accordance with claim 10, wherein forming the fabric layer comprises weaving the fiber thread into a woven material.

12. A method for creating a fibrous material in accordance with claim 10, wherein forming the fabric layer comprises spinning the fiber thread into a spun material or braiding the fiber thread into a braided material.

13. A method for creating a fibrous material in accordance with claim 10, wherein the fiber thread is made from a fiberglass material, or a basalt material.

14. A method for creating a fibrous material in accordance with claim 13, further comprising providing one or more additive materials configured to adjust one or more properties of the fibrous material, the properties including one or more of thermal or electrical conductivity, surface friction, cure time of the fibrous material during manufacture or improving the binding of the epoxy resin to the fiber thread.

15. A method for creating a fibrous material in accordance with claim 14, further comprising providing the fibrous material with at least two sections along the fibrous material configured with different properties.

16. A method for creating a fibrous material in accordance with claim 10, wherein the fibrous material is formed into the shape of a pipe.

17. A fibrous material in accordance with claim 1, further comprising one or more additive materials configured to adjust surface friction of the fibrous material, and the one or more additive materials comprise one or more of molybdenum disilicide or boron nitride.

18. A fibrous material in accordance with claim 1, further comprising one or more additive materials configured to adjust cure time of the fibrous material, and the one or more additive materials comprise one or more of methyl acrylate or cyanoacrylate.

19. The fibrous material in accordance with claim 1, where in the fiber thread comprises grooves.

* * * * *